(12) United States Patent
Rumiel et al.

(10) Patent No.: US 12,054,272 B2
(45) Date of Patent: Aug. 6, 2024

(54) ASSEMBLY OF A PYLON WITH AN ENGINE OF AN AIRCRAFT

(71) Applicant: Airbus Operations SAS, Toulouse (FR)

(72) Inventors: Franck Rumiel, Toulouse (FR); Thomas Robiglio, Toulouse (FR); Paolo Messina, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 0 days.

(21) Appl. No.: 17/964,083

(22) Filed: Oct. 12, 2022

(65) Prior Publication Data

US 2023/0122444 A1 Apr. 20, 2023

(30) Foreign Application Priority Data

Oct. 14, 2021 (FR) ........................................ 2110919

(51) Int. Cl.
*B64D 27/40* (2024.01)
(52) U.S. Cl.
CPC ............ *B64D 27/40* (2024.01); *B64D 27/402* (2024.01); *B64D 27/404* (2024.01)
(58) Field of Classification Search
CPC ..... B64D 27/40; B64D 27/402; B64D 27/404
See application file for complete search history.

(56) References Cited

U.S. PATENT DOCUMENTS

| | | | | |
|---|---|---|---|---|
| 5,320,307 A | * | 6/1994 | Spofford | B64D 27/18 60/797 |
| 5,649,417 A | * | 7/1997 | Hey | B64D 27/40 244/54 |
| 6,601,796 B2 | * | 8/2003 | Roszak | B64D 27/40 60/797 |
| 7,451,947 B2 | * | 11/2008 | Machado | B64D 27/12 60/797 |
| 8,622,341 B2 | * | 1/2014 | Marechal | B64D 27/40 60/797 |

(Continued)

FOREIGN PATENT DOCUMENTS

FR 3059982 A1 6/2018

OTHER PUBLICATIONS

French Search Report dated May 6, 2022; priority document.

*Primary Examiner* — Justin M Benedik
(74) *Attorney, Agent, or Firm* — Greer, Burns & Crain, Ltd.

(57) ABSTRACT

An assembly of a pylon and of an engine with a rear engine attachment having two fittings, wherein each one has a shoe fastened to a lower spar of the pylon, two transverse arms, one front and one rear, which are as one with the shoe and offset such that the front transverse arm, respectively rear transverse arm, of one fitting bears in planar fashion against the front transverse arm, respectively rear transverse arm, of the other fitting, wherein each transverse arm is pierced with a bore, wherein the two front transverse arms and the two rear transverse arms are spaced apart parallel to the longitudinal direction and thus form a female clevis, and wherein the assembly also has a lower rod mounted articulated in the female clevis and on the engine. With such an assembly, the number of components is reduced.

7 Claims, 2 Drawing Sheets

(56) References Cited

U.S. PATENT DOCUMENTS

| | | | |
|---|---|---|---|
| 8,814,079 B2 * | 8/2014 | Teulou | B64D 27/40 |
| | | | 244/54 |
| 9,394,057 B2 * | 7/2016 | Guillou | B64D 27/40 |
| D880,279 S * | 4/2020 | Marchesan | D8/354 |
| 2011/0114786 A1 | 5/2011 | Guillet et al. | |
| 2021/0070459 A1 | 3/2021 | West | |
| 2022/0033098 A1 * | 2/2022 | Frenot | B64D 27/12 |

* cited by examiner

ASSEMBLY OF A PYLON WITH AN ENGINE OF AN AIRCRAFT

CROSS-REFERENCES TO RELATED APPLICATIONS

This application claims the benefit of the French patent application No. 2110919 filed on Oct. 14, 2021, the entire disclosures of which are incorporated herein by way of reference.

FIELD OF THE INVENTION

The present invention relates to an assembly of a pylon with an aircraft engine, and to an aircraft having such an assembly.

BACKGROUND OF THE INVENTION

Conventionally, an aircraft comprises at least one engine, for example a jet engine, fastened beneath each of its wings by means of a pylon constituted of a primary structure in the form of a rigid box. The pylon is attached isostatically beneath the wing by means of fastening members.

The engine is attached beneath the pylon using attachments, in particular a front engine attachment and a rear engine attachment.

FIG. 4 shows a side view of a pylon 302 that is fastened beneath the structure 304 of a wing and supports an engine 306.

The pylon 302 has a primary structure 303 having a longitudinal median plane that separates the primary structure 303 into two parts, port-side and starboard-side.

The primary structure 303 is fastened to the structure 304 by fastening members 308 that have in this case two pairs of rods 310a-b. The rods 310a-b of each pair of rods 310a-b are distributed on either side of the median plane.

The pylon 302 also has a lower fitting 314 fastened in the bottom part and to the rear of the primary structure 303 generally at the median plane.

The fastening members 308 also have a rear rod 312 that is fastened via a connection point to the lower fitting 314 and via a connection point to the structure 304. The rear rod 312 extends generally in the median plane and extends towards the rear from the lower fitting 314.

The primary structure 303 is fastened to the engine 306 by a front engine attachment that fastens a front part of the primary structure 303 to the engine 306 and a rear engine attachment 316 that fastens a rear part of the primary structure 303 to a rear part of the engine 306.

The rear engine attachment 316 generally takes the form of a rod that is fastened via a connection point to the primary structure 303 and via two connection points to the engine 306.

Although such an arrangement is satisfactory, the implementation of this solution requires the use of numerous components and there is therefore a need to find a different arrangement.

SUMMARY OF THE INVENTION

An object of the present invention is to propose an assembly of a pylon with an engine of an aircraft that has a reduced number of components.

To this end, there is proposed an assembly of a pylon and of an engine of an aircraft with a rear engine attachment, the engine having a longitudinal direction, the pylon having a median plane and having a lower spar and two lateral panels disposed on either side of the median plane, the rear engine attachment having a sole formed by two fittings disposed on either side of the median plane, wherein each fitting has a shoe fastened to the lower spar and to one of the lateral panels, two transverse arms spaced apart parallel to the longitudinal direction, specifically a front transverse arm and a rear transverse arm, which are as one with the shoe and extend perpendicular to the longitudinal direction, the front transverse arm, respectively rear transverse arm, of one fitting bearing in planar fashion against the front transverse arm, respectively rear transverse arm, of the other fitting, wherein each transverse arm is pierced with a bore, wherein all the axes of the bores in the transverse arms are coaxial, wherein the two front transverse arms and the two rear transverse arms thus form a female clevis, and wherein the assembly also has a lower rod mounted articulated in the female clevis and on the engine.

With such an assembly, the number of components is reduced.

According to one particular embodiment, the front transverse arm, respectively rear transverse arm, of one fitting is offset towards the front along the longitudinal axis with respect to the front transverse arm, respectively rear transverse arm, of the other fitting.

According to another particular embodiment, the front transverse arm and the rear transverse arm of one fitting are disposed between the front transverse arm and the rear transverse arm of the other fitting.

Advantageously, each shoe takes the form of an L-shaped profile of which one wall is fastened to the lower spar and of which the other wall is fastened to the lateral panel.

Advantageously, the assembly has a wing with a structure and a rear rod and the rear rod has a first end mounted articulated on the structure of the wing and a second end mounted articulated on the rear engine attachment.

Advantageously, each fitting has a blade as one with the shoe and pierced with a bore of which the axis is perpendicular to the median plane, the two blades are in planar contact with one another, their bores are coaxial and the two blades together constitute a male clevis that is inserted into a female clevis arranged at the second end of the rear rod and wherein the two devises are mounted articulated by way of a shaft.

The invention also proposes an aircraft having at least one assembly according to one of the preceding variants.

BRIEF DESCRIPTION OF THE DRAWINGS

The abovementioned features of the invention, along with others, will become more clearly apparent upon reading the following description of one exemplary embodiment, said description being given with reference to the appended drawings, in which.

DETAILED DESCRIPTION OF THE PREFERRED EMBODIMENTS

Figure 1:
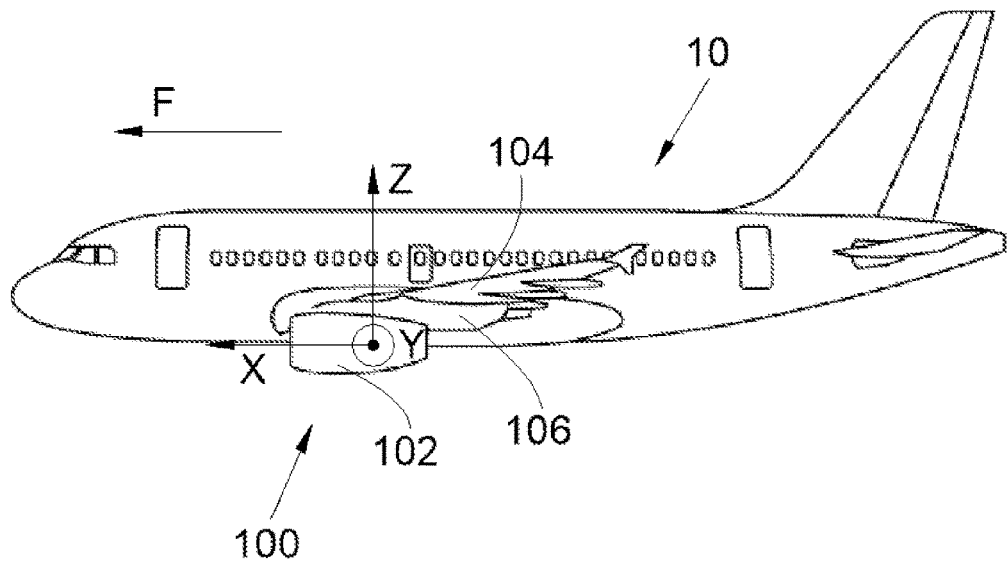
FIG. 1 is a side view of an aircraft according to the invention.

FIG. 1 shows an aircraft 10, which has a propulsion system 100 with an engine 102, for example a jet engine, fastened beneath a wing 104 of the aircraft 10 by way of a pylon 106.

In the following description, terms relating to a position are considered in relation to an aircraft in a normal flight position, i.e., as shown in FIG. 1 and the "front" and "rear" positions are considered relative to the front and the rear of the engine and relative to the direction of forward movement F of the aircraft 10 when the engine 102 is in operation.

In the following description, and by convention, the X direction is the longitudinal direction of the engine, which is parallel to the longitudinal axis of said engine, the Y direction is the transverse direction, which is horizontal when the aircraft is on the ground, and the Z direction is the vertical direction, which is vertical when the aircraft is on the ground, these three directions X, Y and Z being mutually orthogonal.

Figure 2:
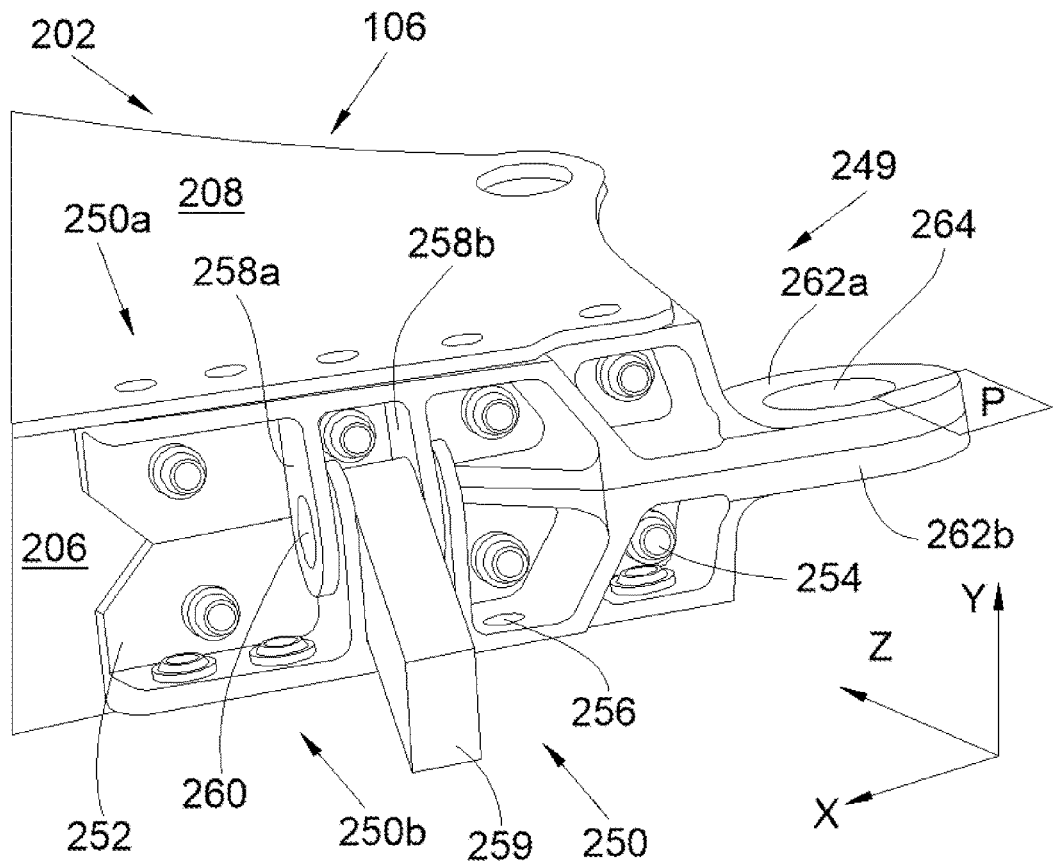
FIG. 2 is a perspective view from below of a pylon implemented in an assembly according to one embodiment of the invention.

As shown in FIG. 2, the pylon 106 comprises a rigid structure 202 forming a box, also called primary structure. The primary structure 202 has, inter alia, an upper spar, a lower spar 206 and two lateral panels 208 disposed on either side of the median plane P and connecting the two spars 206, namely a starboard-side lateral panel (not shown) and a port-side lateral panel 208.

The primary structure 202 is distributed on either side of a longitudinal median plane P parallel to the XZ plane.

Like for the prior art, the primary structure 202 is fastened to a structure of the wing 104 by fastening members that can take the same form as those of the prior art, namely two pairs of rods, wherein the rods of each pair are distributed on either side of the median plane P, and a rear rod extending generally in the median plane P and towards the rear, wherein the various rods are fastened between the pylon 106 and the structure of the wing 104.

The primary structure 202 is fastened to the engine 102 by various engine attachments, including in particular a rear engine attachment 250 that is fastened between the lower spar 206 and the engine 102, and more particularly between a rear part of the lower spar 206 and a rear part of the engine 102.

The assembly according to the invention thus has the pylon 106 and the engine 102 that are fastened, inter alia, by the rear engine attachment 250.

The rear engine attachment 250 has a sole 249 formed by two fittings 250a-b that are generally symmetrical with respect to the median plane P and disposed on either side of said median plane P. Each fitting 250a-b can be produced for example by forging or by deposition of material.

Each fitting 250a-b has a shoe 252 that is fastened to one of the lateral panels 208 and to the lower spar 206, and more particularly in this case to a rear part of the lower spar 206.

In the embodiment of the invention that is presented in FIG. 2, the shoe 252 takes the form of an L-shaped profile of which one wall is fastened to the lower spar 206 and of which the other wall is fastened to one of the lateral panels 208. The fastening is ensured in this case by clamping screws 254 that are screwed respectively into the lower spar 206 or the lateral panel 208, passing through the shoe 252 through bores 256 provided for this purpose.

Each fitting 250a-b also has two transverse arms 258a-b that extend perpendicular to the longitudinal direction X and therefore in this case perpendicular to the median plane P. The two transverse arms 258a-b are mutually parallel and there is thus a front transverse arm 258a and a rear transverse arm 258b that is behind the front transverse arm 258a. The two transverse arms 258a-b are as one with the shoe 252.

The transverse arms 258a-b of the two fittings 250a-b are offset in the longitudinal direction X such that the front transverse arm 258a, respectively rear transverse arm 258b, of one fitting 250a is in front of the front transverse arm 258a, respectively rear transverse arm 258b, of the other fitting 250b. The front transverse arm 258a, respectively rear transverse arm 258b, of one fitting 250a bears in planar fashion against the front transverse arm 258a, respectively rear transverse arm 258b, of the other fitting 250b. The transverse arms 258a-b of the two fittings 250a-b are superposed.

Each transverse arm 258a-b is pierced with a bore 260 and the axes of all the bores 260 are coaxial and in this case parallel to the longitudinal direction X.

The two front transverse arms 258a and the two rear transverse arms 258b are spaced apart parallel to the longitudinal direction X and thus form a female clevis in which is mounted articulated one end of a lower rod 259 that is furthermore mounted articulated on the engine 102, in particular via two connection points.

The lower rod 259 is mounted in the female clevis for example using a shaft that is mounted in the bores 260 and on which the lower rod 259 is fitted, and that therefore acts as points of connection to the lower rod 259. In order to improve the mounting of the shaft in the bores 260, a ring is mounted in the bores 260 in the front transverse arms 258a and a ring is mounted in the bores 260 in the two rear transverse arms 258b.

Such an assembly is therefore relatively simple and requires few pieces.

In the embodiment of the invention that is presented in FIG. 2, the assembly is also fastened to the structure of the wing 104, inter alia, by way of the rear rod that extends generally in the median plane P and towards the rear from the pylon 106.

The real rod has a first end that is mounted articulated on the structure of the wing 104 and a second end that is mounted articulated on the rear engine attachment 250.

Each fitting 250a-b has a blade 262a-b that is as one with the shoe 252 and is pierced with a bore 264 of which the axis is perpendicular to the median plane P.

The two blades 262a-b are in planar contact with one another and their bores 264 are coaxial. The two blades 262a-b together constitute a male clevis that is inserted into a female clevis arranged at the second end of the rear rod and wherein the two devises are mounted articulated by way of a shaft that is mounted in the bores 264 in the male clevis and bores in the female clevis that are provided for this purpose.

Fastening the fittings 250a-b to the lower spar 206 makes it necessary to pierce bores 256 through each fitting 250a-b and through the lower spar 206 so as to fasten the clamping screws 254 thereto. As a result of the geometric manufacturing disparities of the pieces, it is generally the case that two of the four transverse arms 258a-b are indeed bearing against one another but that a gap remains between the other two transverse aims 258a-b. In order to ensure that all the transverse arms 258a-b indeed bear in planar fashion against one another, it is then possible to dispose a shim between the two transverse arms 258a-b that are at a distance from one another.

Such mounting makes it necessary to produce a personalized shim for each assembly since the gap will vary from one assembly to another.

A particular embodiment consists in creating the bores 256 in each fitting 250*a-b* and in the lower spar 206 and in measuring the position and the dimension of each bore 260 thus created and recording this data in a database.

This grouping together of information is carried out for a large number of fittings 250*a-b* and lower spars 206.

From this database, analysis of the database will make it possible to pair the two fittings 250*a-b* and the lower spar 206 that best correspond dimensionally in order to minimize play so that it is not necessary to manufacture and put in place a shim This method thus makes it possible to save time.

In the embodiment of the invention that is presented in FIG. 2, the transverse arms 258*a-b* of one fitting 250*a* are arranged in a staggered manner with respect to the transverse arms 258*a-b* of the other fitting 250*b* in the longitudinal direction X. This means that the front transverse arm 258*a*, respectively rear transverse arm 258*b*, of one fitting 250*a* is offset towards the front along the longitudinal axis X with respect to the front transverse aim 258*a*, respectively rear transverse arm 258*b*, of the other fitting 250*b*.

Figure 3:
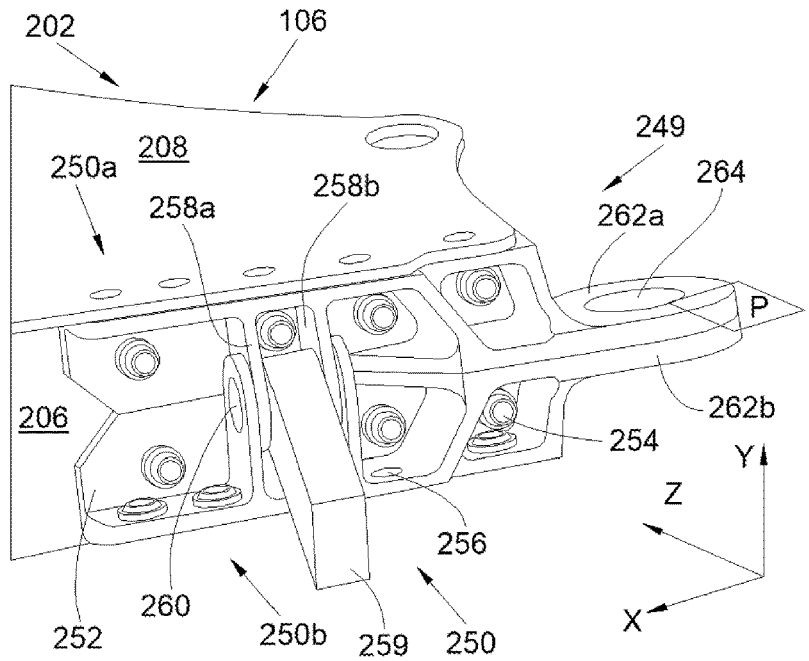
FIG. 3 is a perspective view from below of a pylon implemented in an assembly according to another embodiment of the invention, and FIG. 4, which has already been described, is a side view of an assembly of a pylon, a wing and an engine of the prior art.
Figure 4:
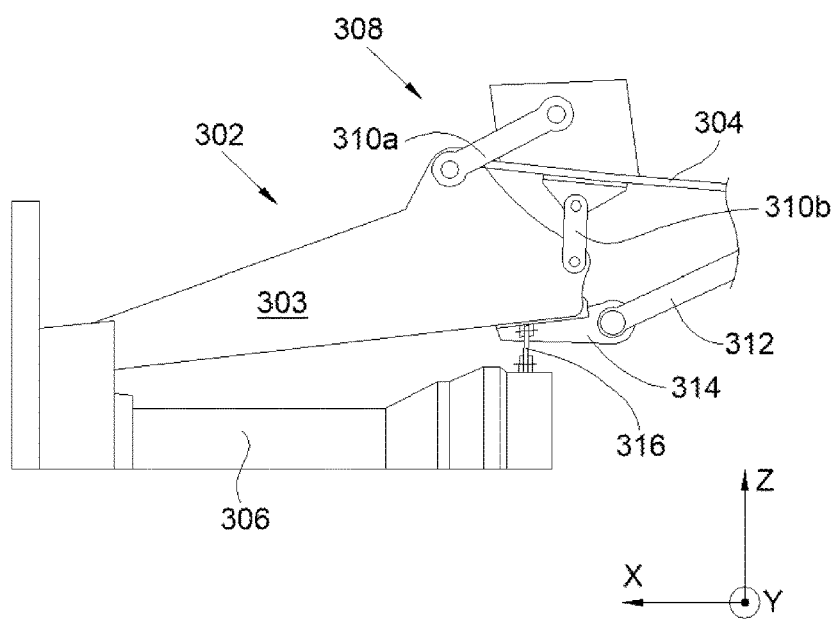

In the embodiment of the invention that is presented in FIG. 3, the front transverse arm 258*a* and the rear transverse arm 258*b* of one fitting 250*a* are disposed between the front transverse arm 258*a* and the rear transverse aim 258*b* of the other fitting 250*b*. This embodiment is a manufacturing alternative of the embodiment described above.

In the embodiment of the invention that is described in FIGS. 2 and 3, the pylon 106 has a median plane P and the lower spar 206 has a U-shaped cross section that is open at the top, with a left-hand edge situated on one side of the median plane P and a right-hand edge situated on the other side of the median plane P. The two lateral panels 208 are disposed on either side of the median plane P, with a left-hand lateral panel 208 fastened to the left-hand edge of the lower spar 206 and a right-hand lateral panel 208 fastened to the right-hand edge of the lower spar 206. Each lateral panel 208 extends downwards beyond the edge of the lower spar 206 to which it is fastened so as to create a space between the lower spar 206 and the two lateral panels 208. The sole 249 is arranged in this space. Thus, for each fitting 250*a-b*, the shoe 252 of said fitting 250*a-b* is fastened both to the lower spar 206 and to one of the lateral panels 208.

In another embodiment, which is not shown in the figures, the pylon 106 has a median plane P and the lower spar has a U-shaped cross section that is, this time, open at the bottom, with a left-hand edge situated on one side of the median plane P, a right-hand edge situated on the other side of the median plane P and a flat part between the two edges. The two lateral panels 208 are disposed on either side of the median plane P, with a left-hand lateral panel 208 fastened to the left-hand edge of the lower spar and a right-hand lateral panel 208 fastened to the right-hand edge of the lower spar. This time, the lateral panels do not extend downwards beyond the lower spar but along the left-hand and right-hand edges of the lower spar. A space is thus created between the left-hand and right-hand edges of the lower spar and beneath the flat part of the lower spar. The sole 249 is then arranged in this space. Thus, for each fitting 250*a-b*, the shoe 252 of said fitting 250*a-b*, which can also take the form of an L-shaped profile, is fastened both to the flat part of the lower spar and to one of the left-hand or right-hand edges of the lower spar and potentially to the lateral panel fastened to the other side of the corresponding edge.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An assembly of a pylon and of an engine of an aircraft with a rear engine attachment,
    the engine having a longitudinal direction,
    the pylon having a median plane and having a lower spar and two lateral panels disposed on either side of the median plane,
    the rear engine attachment having a sole formed by two fittings disposed on either side of the median plane,
    wherein each fitting has a shoe fastened to the lower spar and to one of the lateral panels, a front transverse arm and a rear transverse arm spaced apart parallel to the longitudinal direction, which are as one with the shoe and extend perpendicular to the longitudinal direction,
    wherein the front transverse arm, and rear transverse arm, of one fitting of the two fittings bears in planar fashion against the front transverse arm, and rear transverse arm respectively, of the other fitting of the two fittings,
    wherein each transverse arm is pierced with a bore,
    wherein all axes of the bores are coaxial,
    wherein the two front transverse arms and the two rear transverse arms thus form a female clevis, and
    wherein the assembly has a lower rod mounted articulated in the female clevis and on the engine.

2. The assembly according to claim 1, wherein the front transverse arm, and rear transverse arm, of one fitting of the two fittings is offset towards the front along the longitudinal axis with respect to the front transverse arm, and rear transverse arm respectively, of the other fitting of the two fittings.

3. The assembly according to claim 1, wherein the front transverse arm and the rear transverse arm of one fitting of the two fittings are disposed between the front transverse arm and the rear transverse arm of the other fitting of the two fittings.

4. The assembly according to claim 1, wherein each shoe is formed as an L-shaped profile of which one wall is fastened to the lower spar and of which another wall is fastened to the lateral panel.

5. The assembly according to claim 1, further comprising a wing with a structure and a rear rod and wherein the rear rod has a first end mounted articulated on the structure of the wing and a second end mounted articulated on the rear engine attachment.

6. The assembly according to claim 5,
    wherein each fitting has a blade as one with the shoe and pierced with a bore of which the axis is perpendicular to the median plane,
    wherein the two blades are in planar contact with one another,
    wherein the bores of the two blades are coaxial, and wherein the two blades together constitute a male clevis that is inserted into a female clevis arranged at the second end of the rear rod and wherein the male and female clevises are mounted articulated by way of a shaft.

7. An aircraft having at least one assembly according to claim 1.

\* \* \* \* \*